US010863544B2

(12) United States Patent
Cariou et al.

(10) Patent No.: US 10,863,544 B2
(45) Date of Patent: Dec. 8, 2020

(54) RULES FOR HANDLING MULTIPLE EDCA PARAMETERS

(71) Applicant: Intel IP Corporation, Santa Clara, CA (US)

(72) Inventors: Laurent Cariou, Portland, OR (US); Po-Kai Huang, San Jose, CA (US); Chittabrata Ghosh, Fremont, CA (US); Robert J. Stacey, Portland, OR (US)

(73) Assignee: Intel IP Corporation, Santa Clara, CA (US)

( * ) Notice: Subject to any disclaimer, the term of this patent is extended or adjusted under 35 U.S.C. 154(b) by 36 days.

(21) Appl. No.: 16/399,397

(22) Filed: Apr. 30, 2019

(65) Prior Publication Data

US 2019/0364597 A1 Nov. 28, 2019

Related U.S. Application Data

(63) Continuation of application No. 15/392,574, filed on Dec. 28, 2016, now Pat. No. 10,321,486.

(60) Provisional application No. 62/296,827, filed on Feb. 18, 2016.

(51) Int. Cl.
*H04W 74/08* (2009.01)
*H04W 72/04* (2009.01)

(52) U.S. Cl.
CPC ... *H04W 74/0816* (2013.01); *H04W 72/0413* (2013.01)

(58) Field of Classification Search
CPC ............ H04W 74/0816; H04W 74/08; H04W 74/0808; H04W 72/0413
See application file for complete search history.

(56) References Cited

U.S. PATENT DOCUMENTS

| 10,321,486 B2 | 6/2019 | Cariou et al. |
| 2013/0194931 A1 | 8/2013 | Lee et al. |
| 2017/0245261 A1 | 8/2017 | Cariou et al. |
| 2018/0049240 A1 | 2/2018 | Kim et al. |

OTHER PUBLICATIONS

"U.S. Appl. No. 15/392,574, Non Final Office Action dated Aug. 27, 2018", 11 pgs.
"U.S. Appl. No. 15/392,574, Notice of Allowance dated Jan. 30, 2019", 7 pgs.
"U.S. Appl. No. 15/392,574, Response filed Nov. 27, 2018 to Non Final Office Action dated Aug. 27, 2018" 9 pgs.

*Primary Examiner* — Walter J Divito
(74) *Attorney, Agent, or Firm* — Schwegman Lundberg & Woessner, P.A.

(57) ABSTRACT

Methods and devices are described for providing wireless stations (STAs) with two sets of enhanced distributed channel access (EDCA) parameters. Legacy EDCA parameters that are for single user (SU) operations and may be used by both high-efficiency (HE) STAs and legacy STAs without multi-user (MU) capability. MU EDCA parameters are defined to be more restrictive than legacy EDCA parameters in favoring MU operations. Embodiments are described that define sets of rules for regulating how STAs capable of both SU and MU uplink operations can use the different sets of EDCA parameters.

20 Claims, 4 Drawing Sheets

RULES FOR HANDLING MULTIPLE EDCA PARAMETERS

PRIORITY CLAIM

This application is a continuation of U.S. patent application Ser. No. 15/392,574, filed Dec. 28, 2016, which claims priority to U.S. Provisional Patent Application Ser. No. 62/296,827 filed Feb. 18, 2016, each of which are incorporated herein by reference in their entirety

TECHNICAL FIELD

Embodiments described herein relate generally to wireless networks and communications systems.

BACKGROUND

Wireless networks as defined by the IEEE 802.11 specifications (sometimes referred to as Wi-Fi) are currently being advanced to provide much greater average throughput per user to serve future communications needs. 802.11ax, also called High-Efficiency Wireless or HEW, focuses on implementing mechanisms to serve more users a consistent and reliable stream of data in the presence of many other users. One feature of the 802.11a.x standard is the use of multi-user (MU) technologies. The IEEE 802.11ax standard as presently proposed incorporates features that include, for example, downlink and uplink multi-user (MU) operation by means of orthogonal frequency division multiple access (OFDMA) and multi-user multiple-input-multiple-output (MU-MIMO) technologies. These features require an access point of a wireless network to take a more active role in scheduling downlink and uplink transmissions of associated stations.

DETAILED DESCRIPTION

Figure 1:
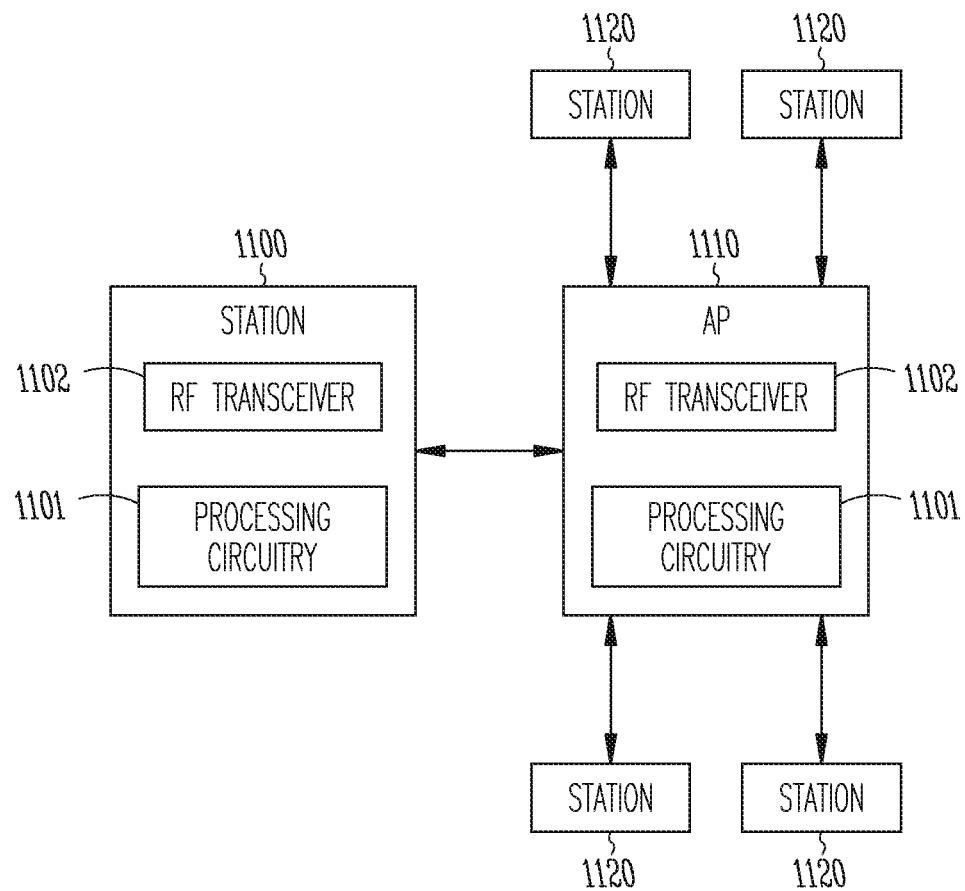
FIG. 1 illustrates a basic service set that includes station devices associated with an access point.

In an 802.11 local area network (LAN), the entities that wirelessly communicate are referred to as stations (STAs). A basic service set (BSS) refers to a plurality of stations that remain within a certain coverage area and forms some sort of association and is identified by the SSID of the BSS. In one form of association, the stations communicate directly with one another in an ad-hoc network. More typically, however, the stations associate with a central station dedicated to managing the BSS and referred to as an access point (AP). FIG. 1 illustrates a BSS that includes a station device 1100 associated with an access point (AP) 1110, where the AP 1110 may be associated with a number of other stations 1120. The device 1100 may be any type of device with functionality for connecting to a WiFi network such as a computer, smart phone, or a UE (user equipment) with WLAN access capability, the latter referring to terminals in a LTE (Long Term Evolution) network. Each of the station devices include an RF (radio frequency transceiver) 1102 and processing circuitry 1101 as shown by the depictions of devices 1100 and 1110. The processing circuitry includes the functionalities for WiFi network access via the RF transceiver as well as functionalities for processing as described herein. The RF transceivers of the station device 1100 and access point 1110 may each incorporate one or more antennas. The RF transceiver 1100 with multiple antennas and processing circuitry 101 may implement one or more MIMO (multi-input multi-output) techniques such as spatial multiplexing, transmit/receive diversity, and beam forming. The devices 1100 and 1110 are representative of the wireless access points and stations described below.

In an 802.11 WLAN network, the stations communicate via a layered protocol that includes a physical layer (PHY), a medium access control (MAC) layer, and a logical link control (LLC) layer. The MAC layer receives data from the logical link control (LLC) layer, and delivers data to the LLC layer through the MAC service data unit (MSDU). The PHY layer receives data from the MAC and delivers data to the MAC in a PHY SDU (PSDU). Protocol entities in one device exchange data and control information with their peer entities in another device via protocol data units (PDUs). The MAC entity exchanges MAC PDUs (MPDUs) with its peer and the PHY entities exchanges PHY PDUs with its peer The MAC layer is a set of rules that determine how to access the medium in order to send and receive data, and the details of transmission and reception are left to the PHY layer. At the MAC layer, transmissions in an 802.11 network are in the form of MAC frames of which there are three main types: data frames, control frames, and management frames. Data frames carry data from station to station. Control frames, such as request-to-send (RTS) and clear-to-send (CTS) frames are used in conjunction with data frames deliver data reliably from station to station. Management frames are used to perform network management functions. Management frames include beacon frames which are transmitted periodically by the AP at defined beacon intervals and which contain information about the network and also indicate whether the AP has buffered data which is addressed to a particular station or stations. Other management frames include probe request frames sent by a station probing for the existence of a nearby AP and probe response frames sent by an AP in response to a probe request frame.

Legacy 802.11 networks utilize a CSMA/CA (carrier sense multiple access/collision avoidance) mechanism in the MAC layer referred to as the distributed coordination function (DCF). A STA with something to transmit first performs a clear channel assessment (CCA) by sensing the medium for a specified duration, the DCF inter-frame space (DIFS). If the medium is idle, then the STA assumes that it may access the medium and begins a frame exchange sequence. If the medium is busy, the station waits for the medium to go idle, defers for DIFS, and waits for a further random backoff period. To begin the random backoff procedure, the station selects a random backoff count in a range defined by the contention window (CW). During each backoff time slot, the station continues to monitor the medium. If the medium becomes busy during a backoff slot then the backoff procedure is suspended. The backoff count is resumed when the medium goes idle again for a DIFS period. If the medium remains idle for the DIFS deferral and the backoff period, the station then accesses the medium and begins a frame exchange sequence.

Enhanced distributed channel access (EDCA) is an extension of the basic DCF to support prioritized quality of service (QoS). The EDCA mechanism defines four access categories (ACs) where each AC is characterized by specific values for a set of access parameters that statistically prioritize channel access for one AC over another. MSDUs are prioritized as to channel access by being assigned to a particular AC. Also, contention windows (CWs) for use in the backoff procedure described above are defined for each AC.

The 802.11ax standard provides for downlink (DL) and uplink (UL) multi-user (MU) operation. Multiple simultaneous transmissions to different STAs from the AP in the DL and from multiple STAs to the AP in the UL are enabled via MU-MIMO and/or orthogonal frequency division multiple access (OFDMA). With OFDMA, the AP assigns separate subsets of OFDMA subcarriers, referred to as resource units (RUs), to individual STAs for UL and DL transmissions. With MU-AMMO, multiple antenna beamforming techniques are used to form spatial streams (SSs) that the AP assigns to STAs for UL and DL transmissions.

Figure 2:
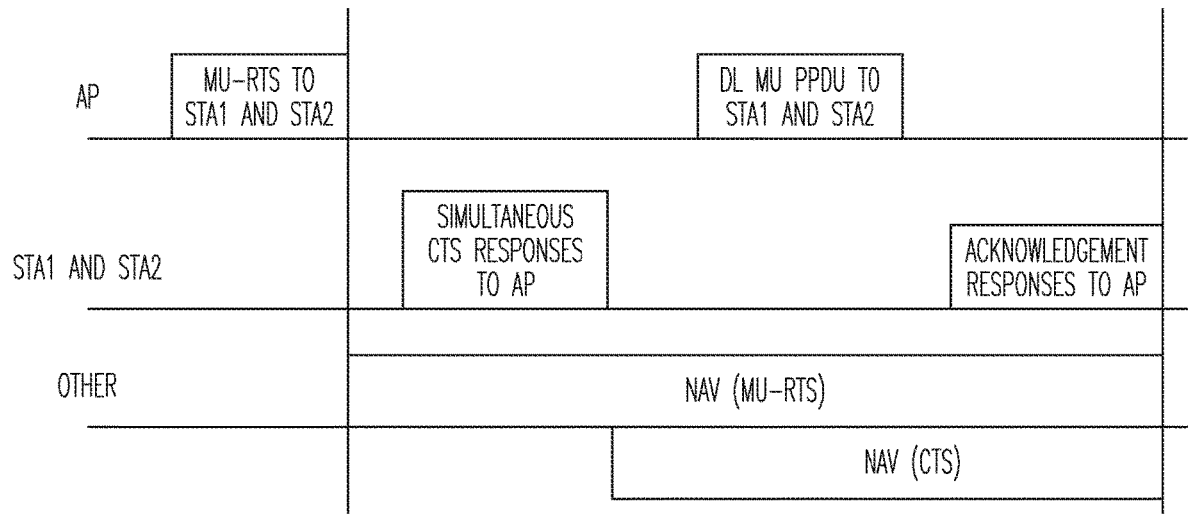
FIG. 2 shows an example where the AP transmits an MU-RTS to stations STA1 and STA2 before transmitting downlink data according to some embodiments.
Figure 3:
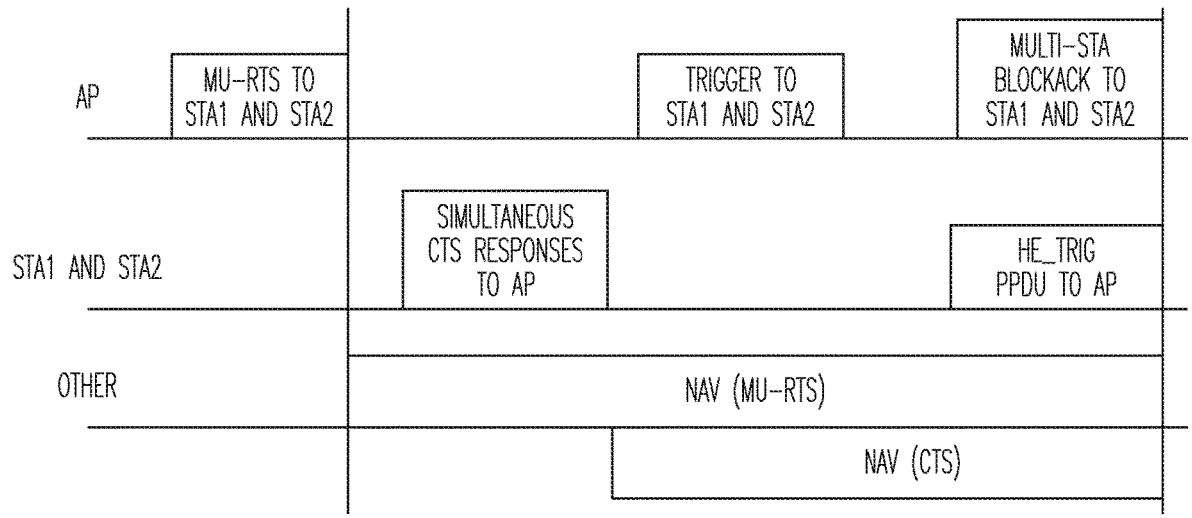
FIG. 3 illustrates an example procedure where an AP transmits a Trigger to STA1 and STA2 in order to elicit uplink transmissions according to some embodiments.

In single-user (SU) operations, STAs and APs are responsible for scheduling their own transmissions by contending for the medium in accordance with the DCF or EDCA mechanisms described above. In order to implement UL and DL MU operations as defined by the 802.11ax standard, the AP is more involved than in previous generations of the standard in scheduling UL and DL data transfers. A STA in an 802.11ax network can also rely more on AP scheduling for its channel access. The current IEEE 802.11ax specification describes a multi-user (MU) protection procedure based on transmission of MU-RTS (which is a trigger frame subtype) by the AP to initiate simultaneous CTS responses from multiple STAs. The MU-RTS/CTS procedure allows a high-efficiency (HE) AP to protect its MU transmission for HE STAs. FIGS. 2 and 3 illustrate examples of this procedure. FIG. 2 shows an example where the AP transmits an MU-RTS to stations STA1 and STA2 before transmitting downlink (DL) data. The duration field of the MU-RTS carries a NAV (network allocation vector) setting that lasts from the end of the MU-RTS until the end of the Acknowledgement Responses from STA1 and STA2. Simultaneous CTS responses are transmitted from STA1 and STA2 with NAV settings that last until the end of the Acknowledgement Responses from STA1 and STA2 in response to the DL MU physical protocol data unit (PPDU) transmission from the AP to STA1 and STA2. FIG. 3 illustrates a similar procedure where the AP transmits a Trigger to STA1 and STA2 after receiving the CTS responses transmitted from STA1 and STA2 in order to elicit uplink transmissions from those stations (labeled as HE-Trig PPDU to AP) to which the AP responds with a block acknowledgement (labeled as Multi-Sta Block Ack to STA1 and STA2).

In the MU operations described above, the AP accesses the channel to send a trigger frame that triggers UL transmissions from multiple STAs. The channel access function is thus entirely transferred to the AP side and managed by the AP EDCAF (EDCA function). STAs, however, have traditionally had an EDCAF to access the channel in the UL to send SU PPDUs to the AP. When HE STAs are UL MU capable, they can either access the channel with their EDCAF to send an SU PPDU to the AP, or be scheduled in UL MU by the reception of a trigger frame from the AP.

For several reasons, improved efficiency can be obtained by forcing HE STAs to modify their EDCA parameter, in order to favor UL MU operations in place of UL SU operations. Legacy STAs, however, should still be able use normal EDCA parameters, in order not to be disfavored. In one embodiment, STAs are provided with two sets of EDCA parameters. The first set may be referred to as legacy EDCA parameters that are for SU operations and may be used by both HE STAs and legacy STAs without MU capability. A second set of parameters may be referred to as MU EDCA parameters which are defined to be more restrictive than legacy EDCA parameters in favoring MU operations. Described below are embodiments that define sets of rules for regulating how STAs capable of both UL SU and UL MU operations can use the relevant set of EDCA parameters.

In one embodiment, an HE STA dynamically selects from the different sets of parameters depending on specific conditions. For example, the HE STA may operate with the MU EDCA parameters only for the MSDUs in its queue that the AP is aware of. That is, the STA trusts that the AP it will efficiently schedule its traffic vial UL MU operations. The HE STA then operates with the legacy EDCA parameters for all MSDUs for which the AP has not been informed. This embodiment may be implemented as described below.

Every time a new MSDU arrives in an empty AC (access category), the STA can access the channel with the legacy EDCA parameters to transmit this MSDU in SU mode. As the MSDUs accumulate in the STAs queue for that AC, the STA, as part of its UL SU transmission or via other ways such as a response to a short resource request trigger or to a buffer status feedback request, informs the AP that it has some traffic to send. When the STA receives a trigger frame scheduling the STA for an AC, the STA switches to MU EDCA parameters only for that AC. The STA then basically trusts that the AP will be able to schedule the STA efficiently for that particular AC traffic. The STA may cooperate by indicating regularly the evolution of its buffer status to the AP, e.g., by piggybacking this information with its data. The STA may then switch back to the legacy EDCA parameters for that particular AC when the STA has transmitted all MSDUs from that AC, for which the AP is aware of (via, e.g., a buffer status report, a more data bit indication, or a short resource request). In order to have a way out in case the AP is not efficient, the STA may switch back to the legacy EDCA parameters if the STA has not been scheduled after a pre-defined timeout period after the last time the STA was scheduled in UL MU.

In one embodiment, when switching from one set of EDCA parameters to another, a new backoff value is generated with the new parameters for the related AC. Alternatively, a new backoff value is generated with the new parameters, but the amount of timeslots that have already been decremented from the last backoff generation can also be decremented directly from the new backoff. For example, the STA may: 1) operate with legacy EDCA parameters; 2) get a backoff value of 15; 3) decrement the backoff value to 10; 4) be scheduled in UL and generate a new backoff value of 25. As the STA's backoff value was decremented previously by 5, it can use the new backoff value of 20.

In one embodiment, the different sets of EDCA parameters may be signaled by the AP in beacons, probe responses, or other management frames. The timeout period, at the expiration of which a STA may switch from MU EDCA parameters to legacy EDCA parameters, may be either defined value or may be signaled by the AP in beacons, probe responses, or other management frames. In another embodiment, the set of EDCA parameters (legacy or MU) is statically selected and decided upon either by the AP or the STA. In this embodiment, a STA operating in the MU mode would be able to transmit SU PPDUs and UL MU PPDUs if using the MU EDCA parameters, while a STA operating only under the SU mode would use the legacy EDCA parameters.

Example UE Description

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

Figure 4:
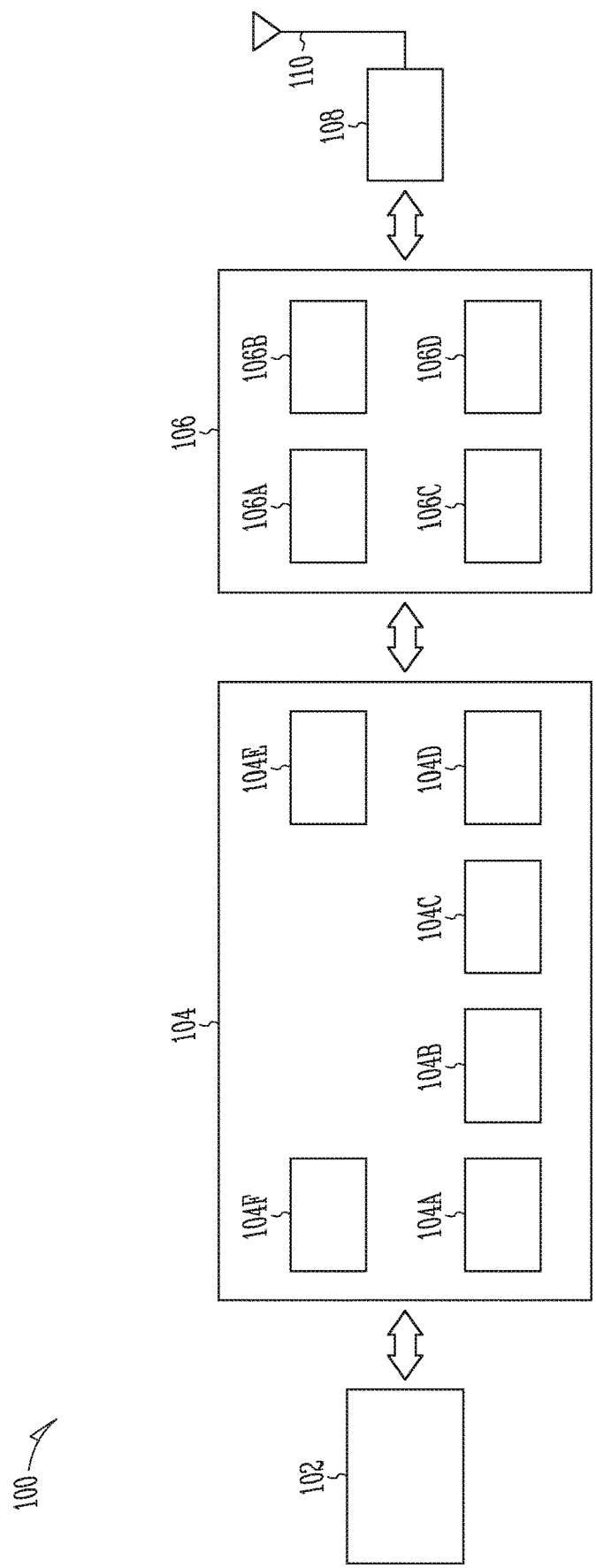
FIG. 4 illustrates an example of a user equipment device according to some embodiments.

Embodiments described herein may be implemented into a system using any suitably configured hardware and/or software. FIG. 4 illustrates, for one embodiment, example components of a User Equipment (UE) device 100. In some embodiments, the UE device 100 may include application circuitry 102, baseband circuitry 104, Radio Frequency (RF) circuitry 106, front-end module (FEM) circuitry 108 and one or more antennas 110, coupled together at least as shown.

The application circuitry 102 may include one or more application processors. For example, the application circuitry 102 may include circuitry such as, but not limited to, one or more single-core or multi-core processors. The processor(s) may include any combination of general-purpose processors and dedicated processors (e.g., graphics processors, application processors, etc.). The processors may be coupled with and/or may include memory/storage and may be configured to execute instructions stored in the memory/storage to enable various applications and/or operating systems to run on the system.

The baseband circuitry 104 may include circuitry such as, but not limited to, one or more single-core or multi-core processors. The baseband circuitry 104 may include one or more baseband processors and/or control logic to process baseband signals received from a receive signal path of the RF circuitry 106 and to generate baseband signals for a transmit signal path of the RF circuitry 106. Baseband processing circuitry 104 may interface with the application circuitry 102 for generation and processing of the baseband signals and for controlling operations of the RF circuitry 106. For example, in some embodiments, the baseband circuitry 104 may include a second generation (2G) baseband processor 104a, third generation (3G) baseband processor 104b, fourth generation (4G) baseband processor 104c, and/or other baseband processor(s) 104d for other existing generations, generations in development or to be developed in the future (e.g., fifth generation (5G), 6G, etc.). The baseband circuitry 104 (e.g., one or more of baseband processors 104a-d) may handle various radio control functions that enable communication with one or more radio networks via the RF circuitry 106. The radio control functions may include, but are not limited to, signal modulation/demodulation, encoding/decoding, radio frequency shifting, etc. In some embodiments, modulation/demodulation circuitry of the baseband circuitry 104 may include Fast-Fourier Transthim (FFT), precoding, and/or constellation mapping/demapping functionality. In some embodiments, encoding/decoding circuitry of the baseband circuitry 104 may include convolution, tail-biting convolution, turbo, Viterbi, and/or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 104 may include elements of a protocol stack such as, for example, elements of an evolved universal terrestrial radio access network (EUTRAN) protocol including, for example, physical (PHY), media access control (MAC), radio link control (RLC), packet data convergence protocol (PDCP), and/or radio resource control (RRC) elements. A central processing unit (CPU) 104e of the baseband circuitry 104 may be configured to run elements of the protocol stack for signaling of the PHY, MAC, RLC, PDCP and/or RRC layers. In some embodiments, the baseband circuitry may include one or more audio digital signal processor(s) (DSP) 104f. The audio DSP(s) 104f may be include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 104 and the application circuitry 102 may be implemented together such as, for example, on a system on a chip (SOC).

In some embodiments, the baseband circuitry 104 may provide for communication compatible with one or more radio technologies. For example, in some embodiments, the baseband circuitry 104 may support communication with an evolved universal terrestrial radio access network (EUTRAN) and/or other wireless metropolitan area networks (WMAN), a wireless local area network (WLAN), a wireless personal area network (WPAN). Embodiments in which the baseband circuitry 104 is configured to support radio communications of more than one wireless protocol may be referred to as multi-mode baseband circuitry.

RF circuitry 106 may enable communication with wireless networks using modulated electromagnetic radiation through a non-solid medium. In various embodiments, the RF circuitry 106 may include switches, filters, amplifiers, etc. to facilitate the communication with the wireless network. RF circuitry 106 may include a receive signal path which may include circuitry to down-convert RF signals received from the FEM circuitry 108 and provide baseband signals to the baseband circuitry 104. RF circuitry 106 may also include a transmit signal path which may include circuitry to up-convert baseband signals provided by the baseband circuitry 104 and provide RF output signals to the FEM circuitry 108 for transmission.

In some embodiments, the RF circuitry 106 may include a receive signal path and a transmit signal path. The receive signal path of the RF circuitry 106 may include mixer circuitry 106a, amplifier circuitry 106b and filter circuitry 106c. The transmit signal path of the RF circuitry 106 may include filter circuitry 106c and mixer circuitry 106a. RF circuitry 106 may also include synthesizer circuitry 106d for synthesizing a frequency for use by the mixer circuitry 106a of the receive signal path and the transmit signal path. In some embodiments, the mixer circuitry 106a of the receive signal path may be configured to down-convert RF signals received from the FEM circuitry 108 based on the synthesized frequency provided by synthesizer circuitry 106d. The amplifier circuitry 106b may be configured to amplify the down-converted signals and the filter circuitry 106c may be a low-pass filter (LPF) or band-pass filter (BPF) configured to remove unwanted signals from the down-converted signals to generate output baseband signals. Output baseband signals may be provided to the baseband circuitry 104 for further processing. In some embodiments, the output baseband signals may be zero-frequency baseband signals, although this is not a requirement. In some embodiments, mixer circuitry 106a of the receive signal path may comprise passive mixers, although the scope of the embodiments is not limited in this respect.

In some embodiments, the mixer circuitry 106a of the transmit signal path may be configured to up-convert input baseband signals based on the synthesized frequency provided by the synthesizer circuitry 106d to generate RF output signals for the FEM circuitry 108. The baseband signals may be provided by the baseband circuitry 104 and may be filtered by filter circuitry 106c. The filter circuitry 106c may include a low-pass filter (LPF), although the scope of the embodiments is not limited in this respect.

In some embodiments, the mixer circuitry 106a of the receive signal path and the mixer circuitry 106a of the transmit signal path may include two or more mixers and may be arranged for quadrature downconversion and/or upconversion respectively. In some embodiments, the mixer circuitry 106a of the receive signal path and the mixer circuitry 106a of the transmit signal path may include two or more mixers and may be arranged for image rejection (e.g., Hartley image rejection). In some embodiments, the mixer circuitry 106a of the receive signal path and the mixer circuitry 106a may be arranged for direct downconversion and/or direct upconversion, respectively. In some embodiments, the mixer circuitry 106a of the receive signal path and the mixer circuitry 106a of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 106 may include analog-to-digital converter (ADC) and digital-to-analog converter (DAC) circuitry and the baseband circuitry 104 may include a digital baseband interface to communicate with the RF circuitry 106.

In some dual-mode embodiments, a separate radio IC circuitry may be provided for processing signals for each spectrum, although the scope of the embodiments is not limited in this respect. In some embodiments, the synthesizer circuitry 106d may be a fractional-N synthesizer or a fractional N/N+1 synthesizer, although the scope of the embodiments is not limited in this respect as other types of frequency synthesizers may be suitable. For example, synthesizer circuitry 106d may be a delta-sigma synthesizer, a frequency multiplier, or a synthesizer comprising a phase-locked loop with a frequency divider. The synthesizer circuitry 106d may be configured to synthesize an output frequency for use by the mixer circuitry 106a of the RF circuitry 106 based on a frequency input and a divider control input. In some embodiments, the synthesizer circuitry 106d may be a fractional N/N+1 synthesizer.

In some embodiments, frequency input may be provided by a voltage controlled oscillator (VCO), although that is not a requirement. Divider control input may be provided by either the baseband circuitry 104 or the applications processor 102 depending on the desired output frequency. In some embodiments, a divider control input (e.g., N) may be determined from a look-up table based on a channel indicated by the applications processor 102.

Synthesizer circuitry 106d of the RF circuitry 106 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 106d may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency ($f_{LO}$). In some embodiments, the RF circuitry 106 may include an IQ/polar converter.

FEM circuitry 108 may include a receive signal path which may include circuitry configured to operate on RF signals received from one or more antennas 110, amplify the received signals and provide the amplified versions of the received signals to the RF circuitry 106 for further processing. FEM circuitry 108 may also include a transmit signal path which may include circuitry configured to amplify signals for transmission provided by the RF circuitry 106 for transmission by one or more of the one or more antennas 110.

In some embodiments, the FEM circuitry 108 may include a TX/RX switch to switch between transmit mode and receive mode operation. The FEM circuitry may include a receive signal path and a transmit signal path. The receive signal path of the FEM circuitry may include a low-noise amplifier (LNA) to amplify received RF signals and provide the amplified received RF signals as an output (e.g., to the RF circuitry 106). The transmit signal path of the FEM circuitry 108 may include a power amplifier (PA) to amplify input RF signals (e.g., provided by RF circuitry 106), and one or more filters to generate RF signals for subsequent transmission (e.g., by one or more of the one or more antennas 110.

In some embodiments, the UE device 100 may include additional elements such as, for example, memory/storage, display, camera, sensor, and/or input/output (I/O) interface.

Example Machine Description

Figure 5:
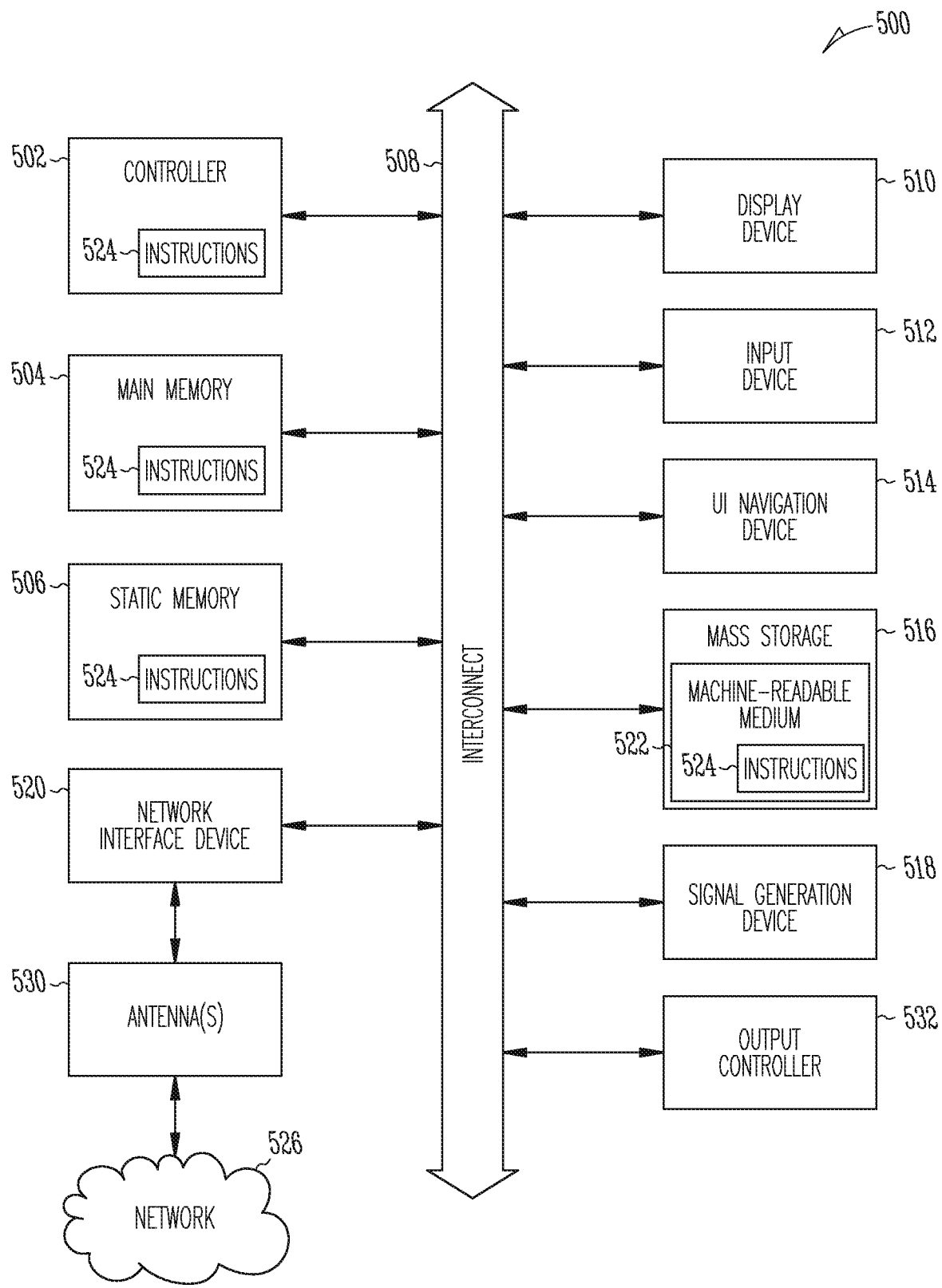
FIG. 5 illustrates an example of a computing machine according to some embodiments.

FIG. 5 illustrates a block diagram of an example machine 500 upon which any one or more of the techniques (e.g., methodologies) discussed herein may perform. In alternative embodiments, the machine 500 may operate as a standalone device or may be connected (e.g., networked) to other machines. In a networked deployment, the machine 500 may operate in the capacity of a server machine, a client machine, or both in server-client network environments. In an example, the machine 500 may act as a peer machine in peer-to-peer (P2P) (or other distributed) network environment. The machine 500 may be a user equipment (UE), evolved Node B (eNB), Wi-Fi access point (AP), Wi-Fi station (STA), personal computer (PC), a tablet PC, a set-top box (STB), a personal digital assistant (PDA), a mobile telephone, a smart phone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

Machine (e.g., computer system) 500 may include a hardware processor 502 (e.g., a central processing unit (CPU), a graphics processing unit (GPU), a hardware processor core, or any combination thereof), a main memory 504 and a static memory 506, some or all of which may communicate with each other via an interlink (e.g., bus) 508. The machine 500 may further include a display unit 510, an alphanumeric input device 512 (e.g., a keyboard), and a user interface (UI) navigation device 514 (e.g., a mouse). In an example, the display unit 510, input device 512 and UI navigation device 514 may be a touch screen display. The machine 500 may additionally include a storage device (e.g., drive unit) 516, a signal generation device 518 (e.g., a speaker), a network interface device 520, and one or more sensors 521, such as a global positioning system (GPS) sensor, compass, accelerometer, or other sensor. The machine 500 may include an output controller 528, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 516 may include a machine readable medium 522 on which is stored one or more sets of data structures or instructions 524 (e.g., software) embodying or utilized by any one or more of the techniques or functions described herein. The instructions 524 may also reside, completely or at least partially, within the main memory 504, within static memory 506, or within the hardware processor 502 during execution thereof by the machine 500. In an example, one or any combination of the hardware processor 502, the main memory 504, the static memory 506, or the storage device 516 may constitute machine readable media.

While the machine readable medium 522 is illustrated as a single medium, the term "machine readable medium" may include a single medium or multiple media (e.g., a centralized or distributed database, and/or associated caches and servers) configured to store the one or more instructions 524. The term "machine readable medium" may include any medium that is capable of storing, encoding, or carrying instructions for execution by the machine 500 and that cause the machine 500 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks. In some examples, machine readable media may include non-transitory machine readable media. In some examples, machine readable media may include machine readable media that is not a transitory propagating signal.

The instructions 524 may further be transmitted or received over a communications network 526 using a transmission medium via the network interface device 520 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others. In an example, the network interface device 520 may include one or more physical jacks (e.g., Ethernet, coaxial, or phone jacks) or one or more antennas to connect to the communications network 526. In an example, the network interface device 520 may include a plurality of antennas to wirelessly communicate using at least one of single-input multiple-output (SIMO), multiple-input multiple-output (MIMO), or multiple-input single-output (MISO) techniques. In some examples, the network interface device 520 may wirelessly communicate using Multiple User MIMO techniques. The term "transmission medium" shall be taken to include any intangible medium that is capable of storing, encoding or carrying instructions for execution by the machine 500, and includes digital or analog communications signals or other intangible medium to facilitate communication of such software.

ADDITIONAL NOTES AND EXAMPLES

In Example 1, an apparatus for a wireless station (STA) comprises: memory and processing circuitry to configure the STA to communicate in a wireless network with an access point (AP) over a wireless channel; wherein the processing circuitry is to: access the wireless channel for uplink (UL) transmissions to the AP either using a first set of enhanced distributed channel access (EDCA) parameters, referred to as multi-user (MU) EDCA parameters that favor MU operations in which the AP schedules UL transmissions via trigger frames or using second set of (EDCA parameters, referred to as legacy EDCA parameters, that favor single user (SU) operations in which the STA contends for access to the wireless channel for UL transmissions to the AP; when a medium access control (MAC) service data unit (MSDU) in an empty first access category (AC) is queued for UL transmission, access the wireless channel using legacy EDCA parameters to transmit the MSDU as an SU operation, inform the AP when additional MSDUs in the first AC are queued; and, switch to the MU EDCA parameters for the first AC in response to a trigger frame from the AP that schedules UL transmission for the first AC.

In Example 2, the subject matter of any of the examples herein may optionally include wherein the processing circuitry is to regularly inform the AP as to the status of queued UL transmissions for MDSUs in the first AC.

In Example 3, the subject matter of any of the examples herein may optionally include wherein the processing circuitry is to inform the AP as to the status of its queued UL transmissions queue for MDSUs in the first AC as part of an UL SU transmission, in response to a short resource request trigger, or in response buffer status feedback request.

In Example 4, the subject matter of any of the examples herein may optionally include wherein the processing circuitry is to inform the AP as to the status of queued UL, transmissions by piggybacking the status information with UL data.

In Example 5, the subject matter of any of the examples herein may optionally include wherein the processing circuitry is to switch back to the legacy EDCA parameters for the first AC after all MDSUs in the first AC have been transmitted to the AP.

In Example 6, the subject matter of any of the examples herein may optionally include wherein the processing circuitry is to switch back to the legacy EDCA parameters if the STA has not been scheduled for UL transmission for a specified timeout period after the last UL MU transmission.

In Example 7, the subject matter of any of the examples herein may optionally include wherein the length of the specified timeout period is received from the AP via a management frame.

In Example 8, the subject matter of any of the examples herein may optionally include wherein the processing circuitry is to receive a new backoff value used to contend for the wireless channel when EDCA parameters are switched from one set to another.

In Example 9, the subject matter of any of the examples herein may optionally include wherein the processing circuitry is to receive a new backoff value used to contend for the wireless channel when EDCA parameters are switched from one set to another and decrement the new backoff value by the amount of timeslots that have already been decremented from a previous backoff value.

In Example 10, the subject matter of any of the examples herein may optionally include a radio transceiver having one or more antennas connected to the processing circuitry.

In Example 11, an apparatus for a wireless station device STA comprises: memory and processing circuitry to configure the device to communicate in a wireless network with an access point (AP) over a wireless channel; wherein the processing circuitry is to: access the wireless channel for uplink (UL) transmissions to an access point (AP) either using a first set of enhanced distributed channel access (EDCA) parameters, referred to as multi-user (MU) EDCA parameters that favor MU operations in which the AP schedules UL transmissions via trigger frames or using second set of (EDCA parameters, referred to as legacy EDCA parameters, that favor single user (SU) operations in which the STA contends for access to the wireless channel for UL transmissions to the AP; use legacy EDCA parameters to access the wireless channel to initially transmit UL data and inform the AP as to additional UL data; and, switch to MU EDCA parameters in response a trigger frame from the AP that schedules transmission of the additional UL data.

In Example 11, the subject matter of any of the examples herein may optionally include wherein the processing circuitry is to: when a medium access control (MAC) service data unit (MSDU) in an empty first access category (AC) is queued for UL transmission, access the wireless channel using legacy EDCA parameters to transmit the MSDU as an SU operation; and, inform the AP when additional MSDUs in the first AC are queued and, when a trigger frame from the AP arrives that schedules UL transmission for the first AC, switching to the MU EDCA parameters for the first AC.

In Example 12, an apparatus for a wireless access point (AP) comprises: memory and processing circuitry to configure the AP to communicate in a wireless network with one or more stations (STAs) over a wireless channel; wherein the processing circuitry is to: communicate to the STAs a first set of enhanced distributed channel access (EDCA) parameters, referred to as multi-user (MU) EDCA parameters that favor MU operations in which the AP schedules uplink (UL) transmissions via trigger frames and a second set of EDCA parameters, referred to as legacy EDCA parameters, that favor single user (SU) operations in which the STA contends for access to the wireless channel for UL transmissions to the AP.

In Example 13, the subject matter of any of the examples herein may optionally include wherein the processing circuitry is to statically configure a particular STA to use either MU EDCA parameters or legacy EDCA parameters.

In Example 14, the subject matter of any of the examples herein may optionally include wherein the processing circuitry is to configure a particular STA to dynamically switch between MU EDCA parameters or legacy EDCA parameters.

In Example 15, the subject matter of any of the examples herein may optionally include wherein the processing circuitry is to communicate the first and second sets of EDCA parameters to STAs in beacons, probe responses, or other management frames.

In Example 16, the subject matter of any of the examples herein may optionally include wherein the processing circuitry is to communicate a timeout period to the STAs wherein a STA may switch from MU EDCA parameters to legacy EDCA parameters if the STA has not been scheduled for UL transmission for the length of the timeout period after the last UL MU transmission.

In Example 17, a computer-readable medium contains instructions to cause a STA or AP, upon execution of the instructions by processing circuitry of the STA or AP, to perform any of the functions of the processing circuitry as recited by any of the examples herein.

In Example 18, a method for operating a STA or AP comprises performing any of the functions of the processing circuitry and/or radio transceiver as recited by any of the examples herein.

In Example 19, an apparatus for a STA or AP comprises means for performing any of the functions of the processing circuitry and/or radio transceiver as recited by any of the examples herein.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplate are examples using any combination or permutation of those elements shown or described (or one or more aspects thereof), either with respect to a particular example (or one or more aspects thereof), or with respect to other examples (or one or more aspects thereof) shown or described herein.

Publications, patents, and patent documents referred to in this document are incorporated by reference herein in their entirety, as though individually incorporated by reference. In the event of inconsistent usages between this document and those documents so incorporated by reference, the usage in the incorporated reference(s) are supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." in this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to suggest a numerical order for their objects.

The embodiments as described above may be implemented in various hardware configurations that may include a processor for executing instructions that perform the techniques described. Such instructions may be contained in a machine-readable medium such as a suitable storage medium or a memory or other processor-executable medium.

The embodiments as described herein may be implemented in a number of environments such as part of a wireless local area network (WLAN), 3rd Generation Partnership Project (3GPP) Universal Terrestrial Radio Access Network (UTRAN), or Long-Term-Evolution (LTE) or a Long-Term-Evolution (LTE) communication system, although the scope of the disclosure is not limited in this respect. An example LTE system includes a number of mobile stations, defined by the LTE specification as User Equipment (UE), communicating with a base station, defined by the LTE specifications as an eNodeB.

Antennas referred to herein may comprise one or more directional or omnidirectional antennas, including, for example, dipole antennas, monopole antennas, patch antennas, loop antennas, microstrip antennas or other types of antennas suitable for transmission of RF signals. In some embodiments, instead of two or more antennas, a single antenna with multiple apertures may be used. In these embodiments, each aperture may be considered a separate antenna. In some multiple-input multiple-output (MIMO) embodiments, antennas may be effectively separated to take advantage of spatial diversity and the different channel characteristics that may result between each of antennas and the antennas of a transmitting station. In some MIMO embodiments, antennas may be separated by up to $\frac{1}{10}$ of a wavelength or more.

In some embodiments, a receiver as described herein may be configured to receive signals in accordance with specific communication standards, such as the Institute of Electrical and Electronics Engineers (IEEE) standards including IEEE 802.11-2007 and/or 802.11(n) standards and/or proposed specifications for WLANs, although the scope of the disclosure is not limited in this respect as they may also be suitable to transmit and/or receive communications in accordance with other techniques and standards. In some embodiments, the receiver may be configured to receive signals in accordance with the IEEE 802.16-2004, the IEEE 802.16(e) and/or IEEE 802.16(m) standards for wireless metropolitan area networks (WMANs) including variations and evolutions thereof, although the scope of the disclosure is not limited in this respect as they may also be suitable to transmit and/or receive communications in accordance with other techniques and standards. In some embodiments, the receiver may be configured to receive signals in accordance with the Universal Terrestrial Radio Access Network (UTRAN) LTE communication standards. For more information with respect to the IEEE 802.11 and IEEE 802.16 standards, please refer to "IEEE Standards for Inthimation Technology—Telecommunications and Information Exchange between Systems"—Local Area Networks—Specific Requirements—Part 11 "Wireless LAN Medium Access Control (MAC) and Physical Layer (PHY), ISO/IEC 8802-11: 1999", and Metropolitan Area Networks—Specific Requirements—Part 16: "Air Interface for Fixed Broadband Wireless Access Systems," May 2005 and related amendments/versions. For more information with respect to UTRAN LTE standards, see the 3rd Generation Partnership Project (3GPP) standards for UTRAN-LTE, release 8, March 2008, including variations and evolutions thereof.

The above description is intended to be illustrative, and not restrictive. For example, the above-described examples (or one or more aspects thereof) may be used in combination with others. Other embodiments may be used, such as by one of ordinary skill in the art upon reviewing the above description. The Abstract is to allow the reader to quickly ascertain the nature of the technical disclosure, for example, to comply with 37 C.F.R. § 1.72(b) in the United States of America. It is submitted with the understanding that it will not be used to interpret or limit the scope or meaning of the claims. Also, in the above Detailed Description, various features may be grouped together to streamline the disclosure. However, the claims may not set forth every feature disclosed herein as embodiments may feature a subset of said features. Further, embodiments may include fewer features than those disclosed in a particular example. Thus, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

The invention claimed is:

1. An apparatus of a high-efficiency (HE) station (STA), the apparatus comprising:
memory; and processing circuitry, the processing circuitry to configure the HE STA to communicate with an HE access point (AP) over a channel;
wherein the processing circuitry is to:
decode signalling to receive enhanced distributed channel access (EDCA) parameters announced by the HE AP in beacon frames, wherein the EDCA parameters comprise multi-user (MU) EDCA parameters in addition to non-MU EDC A parameters;
wherein when contending for access to the channel, the processing circuitry is to configure the HE STA to use either the MU EDCA parameters or the non-MU EDCA parameters;
encode a buffer status report (BSR) for transmission to the AP, the BSR to indicate that the HE STA has buffered traffic of a Quality-of-Service (QoS) access category (AC) for transmission to the AP;
decode a trigger frame received from the AP, the trigger frame scheduling an uplink (UL) transmission of a Physical Layer Convergence Protocol (PLCP) protocol data unit (PPDU) for traffic of the AC; and
in response to the trigger frame and after transmission of the PPDU, the processing circuitry is to configure the HE STA use the MU EDCA parameters for subsequent contention-based channel access for transmissions of frames of the AC, wherein the HE STA is configured to use the non-MU EDCA parameters for subsequent contention-based channel access for transmissions of frames of other ACs.

2. The apparatus of claim 1, wherein the processing circuitry is to switch to use of the non-MU EDCA parameters for contention-based channel access for the AC after a timeout period after receipt of the trigger frame.

3. The apparatus of claim 2, wherein the processing circuitry is to switch to use of the non-MU EDCA parameters for contention-based channel access for the AC after the timeout period after receipt of a last trigger frame that schedules an uplink transmission for the AC.

4. The apparatus of claim 2, wherein a length of the timeout period is signalled by the AP as part of the MU EDCA parameters.

5. The apparatus of claim 2, wherein the processing circuitry is configured to contend for access to the channel for transmission of the BSR using the MU-EDCA parameters.

6. The apparatus of claim 2, wherein the processing circuitry is configured to contend for access to the channel for transmission of the BSR using the non-MU-EDCA parameters.

7. The apparatus of claim 2, wherein the processing circuitry is to send the BSR piggy-backed with UL data.

8. The apparatus of claim 2, wherein the processing circuitry is configured to send the BSR in response to a request from the AP.

9. The apparatus of claim 2, wherein the processing circuitry is configured to receive the MU EDCA parameters in a probe response frame.

10. The apparatus of claim 2, wherein the processing circuitry is to, in response to the trigger frame that schedules an UL transmission of the UL traffic of the AC, switch to the MU EDCA parameters only for subsequent contention-based access for the AC of the scheduled LI traffic.

11. The apparatus of claim 2, wherein the MU EDCA parameters are for multi-user uplink transmissions and the non-MU EDCA parameters are for single-user uplink transmissions.

12. A non-transitory computer-readable storage medium that stores instructions for execution by processing circuitry of a high-efficiency (HE) station (STA), the instructions to configure the HE STA to communicate with an HE access point (AP) over a channel;
wherein the processing circuitry is to:
decode signalling to receive enhanced distributed channel access (EDCA) parameters announced by the HE AP in beacon frames, wherein the EDCA parameters comprise multi-user (MU) EDCA parameters in addition to non-MU EDCA parameters;
wherein when contending for access to the channel; the processing circuitry is to configure the HE STA to use either the MU EDCA parameters or the non-MU EDCA parameters;
encode a buffer status report (BSR) for transmission to the AP, the BSR to indicate that the HE STA has buffered traffic of a Quality-of-Service (QoS) access category (AC) for transmission to the AP;
decode a trigger frame received from the AP, the trigger frame scheduling an uplink (UL) transmission of a Physical Layer Convergence Protocol (PLCP) protocol data unit (PPDU) for traffic of the AC; and
in response to the trigger frame and after transmission of the PPDU, the processing circuitry is to configure the HE STA use the MU EDCA parameters for subsequent contention-based channel access for transmissions of frames of the AC, wherein the HE STA is configured to use the non-MU EDCA parameters for subsequent contention-based channel access for transmissions of frames of other ACs.

13. The non-transitory computer-readable storage medium of claim 12, wherein the processing circuitry is to switch to use of the non-MU EDCA parameters for contention-based channel access for the AC after a timeout period after receipt of the trigger frame.

14. The non-transitory computer-readable storage medium of claim 13, wherein the processing circuitry is to switch to use of the non-MU EDCA parameters for contention-based channel access for the AC after the timeout period after receipt of a last trigger frame that schedules an uplink transmission for the AC.

15. The non-transitory computer-readable storage medium of claim 13, wherein a length of the timeout period is signalled by the AP as part of the MU EDCA parameters.

16. The non-transitory computer-readable storage medium of claim 12, wherein the processing circuitry is configured to contend for access to the channel for transmission of the BSR using the MU-EDCA parameters.

17. The non-transitory computer-readable storage medium of claim 12, wherein the processing circuitry is configured to contend for access to the channel for transmission of the BSR using the non-MU-EDCA parameters.

18. An apparatus of a high-efficiency (HE) access point (HE AP), the apparatus comprising:
memory; and processing circuitry, the processing circuitry to configure the HE AP to communicate with an HE station (STA) over a channel;
wherein the processing circuitry is to:
encode signalling to announce enhanced distributed channel access (EDCA) parameters in beacon frames, wherein the EDCA parameters comprise multi-user (MU) EDCA parameters in addition to non-MU EDCA parameters, wherein either the MU EDCA parameters or the non-MU EDCA parameters are to be used by the HE STA when contending for access to the channel;

decode a buffer status report (BSR) from the HE STA, the BSR to indicate that the HE STA has buffered traffic of a Quality-of-Service (QoS) access category (AC) for transmission to the AP;

encode a trigger frame for transmission, the trigger frame to schedule an uplink (UL) transmission by the HE STA of a Physical Layer Convergence Protocol (PLCP) protocol data unit (PPDU) for traffic of the AC; and either decode frames of the AC received from the HE STA after the HE STA acquires access to the channel based on use of the MU EDCA parameters; or decode frames of other ACs received from the HE STA after the HE STA acquires access to the channel based on use of the non-MU EDCA parameters.

19. The apparatus of claim 18, wherein the processing circuitry is configured to encode signalling to request the BSR from the HE STA.

20. The apparatus of claim 18, wherein the processing circuitry is configured to encode the MU EDCA parameters for transmission in a probe response frame.

\* \* \* \* \*

UNITED STATES PATENT AND TRADEMARK OFFICE
CERTIFICATE OF CORRECTION

| | | |
|---|---|---|
| PATENT NO. | : 10,863,544 B2 | Page 1 of 1 |
| APPLICATION NO. | : 16/399397 | |
| DATED | : December 8, 2020 | |
| INVENTOR(S) | : Cariou et al. | |

It is certified that error appears in the above-identified patent and that said Letters Patent is hereby corrected as shown below:

In the Claims

In Column 15, Line 17, in Claim 1, delete "EDC A" and insert --EDCA-- therefor

In Column 15, Line 49, in Claim 5, delete "2," and insert --1,-- therefor

In Column 15, Line 53, in Claim 6, delete "2," and insert --1,-- therefor

In Column 15, Line 57, in Claim 7, delete "2," and insert --1,-- therefor

In Column 15, Line 59, in Claim 8, delete "2," and insert --1,-- therefor

In Column 15, Line 62, in Claim 9, delete "2," and insert --1,-- therefor

In Column 15, Line 65, in Claim 10, delete "2," and insert --1,-- therefor

In Column 16, Line 2, in Claim 10, delete "LI" and insert --UL-- therefor

In Column 16, Line 3, in Claim 11, delete "2," and insert --1,-- therefor

In Column 16, Line 18, in Claim 12, delete "channel;" and insert --channel,-- therefor Signed and Sealed this
Ninth Day of March, 2021

Drew Hirshfeld
*Performing the Functions and Duties of the
Under Secretary of Commerce for Intellectual Property and
Director of the United States Patent and Trademark Office*